United States Patent
Campbell

[15] 3,687,485
[45] Aug. 29, 1972

[54] OCCUPANT RESTRAINT SYSTEM

[72] Inventor: David D. Campbell, Bloomfield Hills, Mich.

[73] Assignee: General Motors Corporation, Detroit, Mich.

[22] Filed: Jan. 11, 1971

[21] Appl. No.: 105,222

[52] U.S. Cl. ........280/150 AB, 280/150 B, 296/84 K
[51] Int. Cl. .............................................B60r 21/08
[58] Field of Search ....280/150 AB, 150 B; 296/84 K

[56] References Cited

UNITED STATES PATENTS

| | | |
|---|---|---|
| 3,494,633 | 2/1970 | Malloy ................280/150 AB |
| 1,256,848 | 2/1918 | Uttz..........................296/84 K |
| 1,624,418 | 4/1927 | Marsh......................296/84 K |
| 2,025,822 | 12/1935 | Pryor .....................280/150 B |
| 2,806,737 | 9/1957 | Maxwell...............280/150 AB |
| 2,834,606 | 5/1958 | Bertrand..............296/84 K X |

FOREIGN PATENTS OR APPLICATIONS

| | | |
|---|---|---|
| 1,937,223 | 1/1970 | Germany................280/150 B |
| 530,653 | 8/1954 | Belgium...................296/84 K |

*Primary Examiner*—Kenneth H. Betts
*Attorney*—W. E. Finken and Herbert Furman

[57] ABSTRACT

A deployable trapezoidal shaped net of flexible material is provided for each side window opening of a vehicle body. Each net has a forward edge portion and an upper edge portion respectively secured to the front pillar and roof rail of a respective window opening. Normally the nets are stored in a folded condition above the headlining and adjacent a respective pillar and roof rail. An inflatable cushion is transversely mounted on the roof structure of the vehicle body. Normally the cushion is stored above the headlining. A continuous loop cable is located at each side of the cushion adjacent each roof rail. The cables are stored above the headlining. Each cable is secured at one point to a respective side of the cushion adjacent the lower edge thereof and extends around a pulley secured to a respective roof rail and a one-way pulley secured to a respective rear quarter structure of the body. The lower rear corner of each net is secured to a respective cable at the same point as the respective side of the inflatable cushion. Upon inflation of the cushion from a pressure source located in the roof structure, the cushion is projected downwardly and rearwardly of the body as the cables move around the pulleys. The cables fix the inflated position of the cushion and limit forward movement of the cushion. The cables also deploy the nets over the window openings. The inflatable cushion, the cables, and the nets tear through the headlining along predetermined tear lines when the cushion and nets are deployed.

4 Claims, 4 Drawing Figures

PATENTED AUG 29 1972

INVENTOR.
David D. Campbell
BY Herbert Furman
ATTORNEY

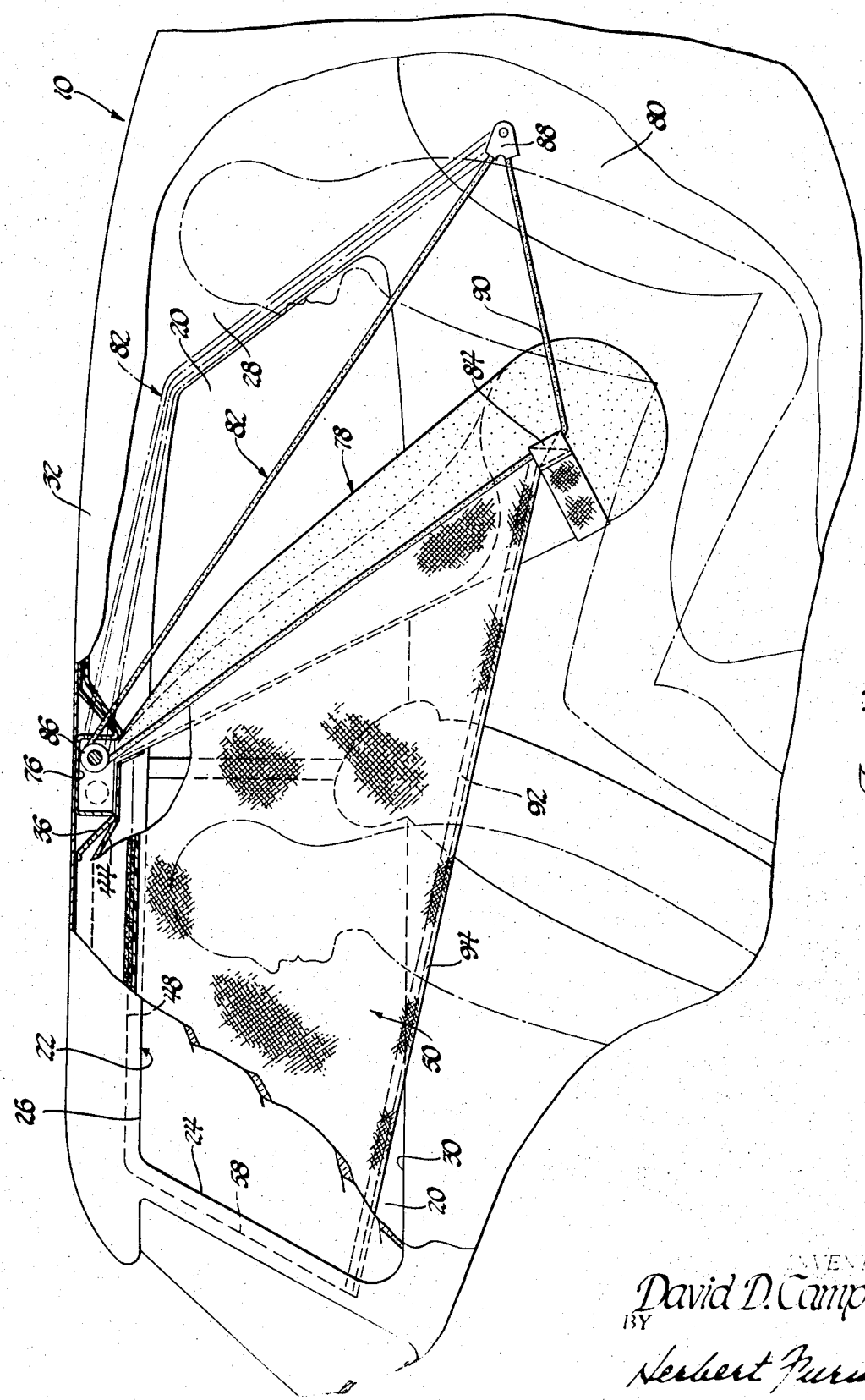

OCCUPANT RESTRAINT SYSTEM

This invention relates to occupant restraint systems and more particularly to nets of flexible material which are normally stored above the side window openings of a vehicle body and are deployed over such window openings when an occupant restraint cushion for seated vehicle passengers is inflated and deployed.

Copending application, Ser. No. 81,249 Barnett et al., Occupant Restraint System, filed Oct. 16, 1970 and assigned to the assignee of this invention, discloses an inflatable occupant restraint cushion which is mounted on the roof structure of a vehicle body and is deployed downwardly to a predetermined position with respect to a seated occupant to both provide a barrier against forward movement of such occupant and to also engage and exert a restraining force on the pelvic area of such occupant. When the cushion is deployed, endless cables secured at one point to the cushion move in one direction around one-way pulleys which block reverse movement of the cables and thereby accurately position the inflated cushion so that it will accomplish its intended purpose.

The nets of this invention, in its preferred embodiment, are intended to be used with cushions of this type. Generally, each net is secured to the front pillar and roof rail of a respective window opening and is normally stored out of such window opening adjacent the pillar and roof rail. The nets are secured to either the inflatable cushion or to the cables, preferably the latter, at the same points that the cables are secured to the cushion. Upon inflation and deployment of the cushion, the nets are deployed over the body window openings and particularly that portion of the openings defined by the pillars, the roof rails, the body belt line structure, and the side edge portions of the cushion.

An object of this invention is to provide an improved occupant restraint system for a vehicle body which includes nets deployed over the body side window openings upon inflation and deployment of a vehicle body roof mounted, inflatable cushion. Another object of this invention is to provide such a system wherein the nets are secured to body structure defining portions of the side window openings and are deployed from a normal stored condition to one side of the openings when the cushion is deployed. A further object of this invention is to provide such a system wherein the cushion is accurately positioned when inflated by a pair of endless cables, each fixed at one point to the cushion and to a respective net, the cables being movable with respect to the body to a fixed position wherein the cables hold the deployed nets in position over the window openings and locate the deployed cushion.

These and other objects of this invention will be readily apparent from the following specification and drawings wherein:

FIG. 4 is an enlarged view of a portion of FIG. 1 showing the occupant restraint system deployed.

Figure 1:
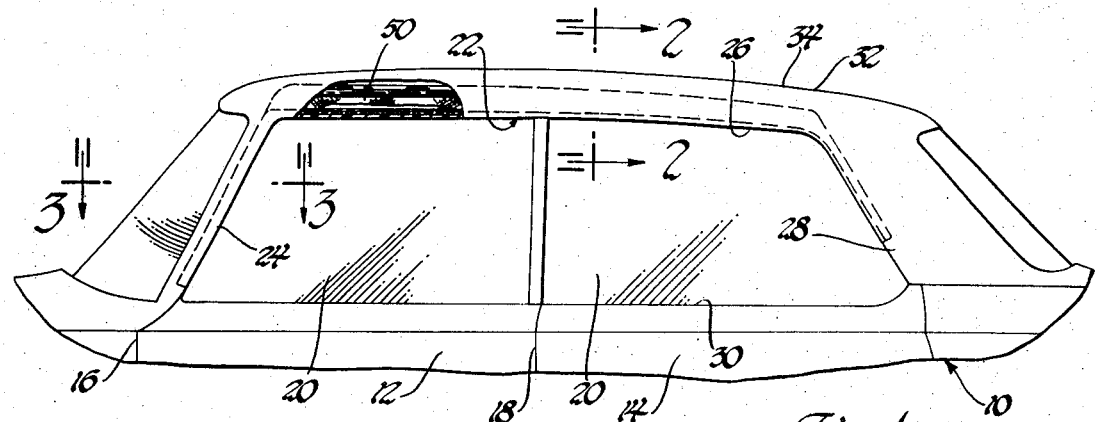
FIG. 1 is a partially broken away partial side elevational view of a vehicle body embodying an occupant restraint system according to this invention.

Referring now particularly to the drawings, a vehicle body designated generally 10 includes a front door 12 and a rear door 14 hinged at their forward edges 16 and 18, respectively, to the body 10 for movement between open and closed positions. Each door includes a vertically movable door window 20 which is conventionally mounted on a respective door for movement between open and closed positions with respect to the body side window openings 22. Each opening is defined by a front pillar 24, a roof rail 26, a rear pillar 28 and the belt line 30 of the body.

Figure 2:
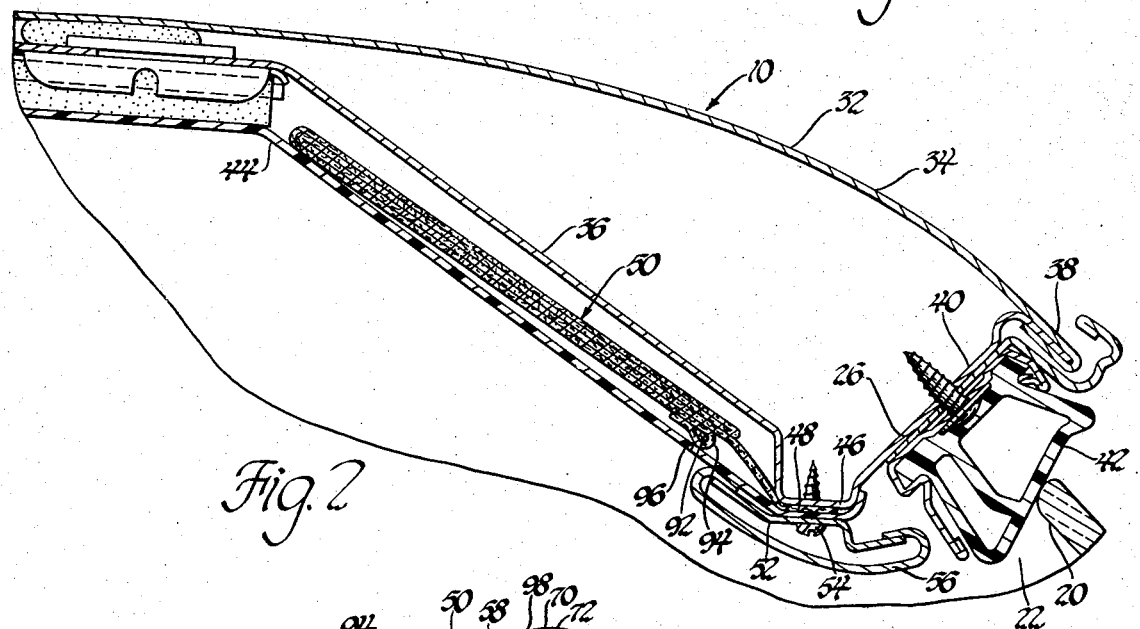
FIG. 2 is an enlarged sectional view taken generally along the plane indicated by line 2—2 of FIG. 1.

The roof rails 26 are provided by the structure 32 which overlies the passenger compartment of the body. The details of the roof structure form no part of this invention and reference may be had to Ser. No. 63,094 Foster et al., Vehicle Body Roof Structure, filed Aug. 12, 1970 now U.S. Pat. No. 3,635,519 issued Jan. 18, 1972 and assigned to the assignee of this invention, for a full disclosure of such details. Generally, the roof structure 32 as shown in FIGS. 2 and 4 includes a roof outer panel 34 and a roof inner panel 36 which are adhesively bonded to each other. The outboard or side edge portions of the inner panel are offset with respect to like edge portions of the outer panel and hem flanged thereto at 38. Such edge portions cooperatively provide the roof rails 26 of the body 10. Lateral flanges 40 of the panel 36 support conventional roof rail weather-strips 42 which seal the upper edges of the windows 20 when the windows are in closed position. The headlining 44 is mounted on the inner panel 36 in a manner described in the aforenoted Foster application and the outboard or side edge portions of the headlining terminate at longitudinally extending ribs 46 of the inner panel. Located between each outboard edge portion of the headlining and each rib 46 is the upper edge portion 48 of a net 50 of flexible material according to this invention. An elongated retainer 52 overlies the pairs of edge portions of the headlining and net and is mounted on each rib 46 by spaced screws 54. The retainers 52 support conventional interior moldings 56.

Figure 3:
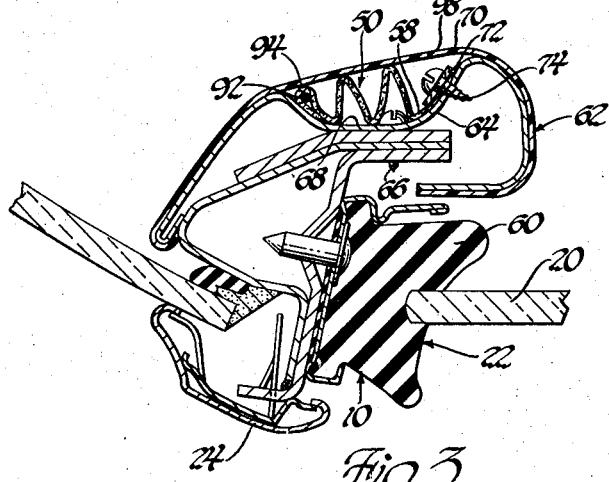
FIG. 3 is an enlarged sectional view taken generally along the plane indicated by line 3—3 of FIG. 1.

As shown best in FIG. 4, each net 50 is generally of trapezoidal shape. The upper edge portion 48 of each net is secured to a rib 46 of the inner panel 36 in a manner immediately described hereinbefore in conjunction with FIG. 2. The forward edge portion 58 of each net is secured to a front pillar 24 as will be now described with reference to FIG. 3. The structure of pillar 24 forms no part of this invention. Generally, however, the windshield is adhesively bonded to each pillar as shown in FIG. 3 and each pillar additionally mounts a weatherstrip 60 which provides a continuation of each weatherstrip 42 and seals the forward edge portion of a respective front door window 20 in closed position. A pillar inner molding 62 for each pillar includes a thin metal backing 64 which is conventionally mounted on a respective pillar 24 by sheet metal screws 66 and includes an elongated recess or trough 68 extending from the instrument panel, not shown, to panel 36. Trough 68 as well as the molding 62 is conventionally covered by interior trim material 70, the edge portions of which are cemented or otherwise adhesively secured to the backing 64. The forward edge portion 58 of each net 50 is secured to a side wall of a respective trough 68 by an elongated retainer 72 and sheet metal screws 74.

When the nets 50 are in an undeployed or stored condition as shown in FIGS. 1 through 3, the nets are located to one side of a respective window opening 22 adjacent an outboard offset edge portion of the roof inner panel 36 as shown in FIG. 2 and also in the trough 68 as shown in FIG. 3. The nets may be stored in either a pleated, rolled, or other type of folded condition. The headlining 44 and the trim material 70 conceal the nets from view when undeployed so that the interior of the vehicle presents a pleasing aesthetic appearance.

Referring now particularly to FIG. 4, the inner panel 36 includes a transversely extending housing 76 which mounts a diffuser, a pressure vessel, and an inflatable cushion 78 of an occupant restraint system for the occupants of the rear seat 80 of the vehicle. The details of such restraint system and the manner in which the cushion 78 is inflated form no part of this invention, and reference may be had to the Barnett et al. application for such details. Generally, the restraint system includes a pair of endless cables 82, each stitched at an anchor point 84 to a respective side edge of the cushion 78 adjacent the lower edge portion thereof. Each cable extends around a respective pulley 86 mounted on a respective side of panel 36 and also through a respective one-way pulley or cleat 88 secured to an inner rear quarter panel of the body. When the cushion 78 is in a stored condition within housing 76, the cables 82 are located as shown in phantom lines in FIG. 4 above the headlining 44.

As set forth in detail in the Barnett et al. application, when a sensing means provided on the vehicle 10 senses an impact condition, the cushion 78 is inflated and deployed downwardly and rearwardly of the vehicle to its position shown in FIG. 4. During such deployment of the cushion, the cushion breaks through the headlining 44 along a tear line provided therein opposite housing 76 and likewise the cables 82 break through the headlining 44 along respective tear lines. The cables move counterclockwise over their respective pulleys 86 and 88 and positively locate the cushion 78 in its inflated position as shown in FIG. 4. The one-way pulleys or cleats 88 permit only counterclockwise movement of the cable 82 therethrough and block any clockwise movement. Thus, when the cushion 78 is finally deployed, it not only firmly engages the pelvic area of a rear seat occupant and applies a rearward and downward restraining force on such area, but also provides a barrier against forward movement of such occupant with respect to the vehicle 10 since it is anchored by the portions 90 of the cables 82 located between the pulleys 88 and the anchor points 84.

As shown in FIGS. 2 and 4, a flexible steel cable 92 is secured within a pocket provided along the lower edge portion 94 of each net 50 by folding such edge portion upon itself and stitching the edge portion to the net. The forward end of each cable 92 is conventionally anchored to a respective trough 68 adjacent the lower end thereof, and the rear end of each cable is secured to a respective cable 82 at an anchor point 84.

As shown in FIG. 2, the headlining 44 is provided with a longitudinal tear line 96 immediately underneath each net 50, and each trim material 70 is provided with a longitudinal tear line 98, FIG. 3, adjacent the retainer strip 72 thereunder. When the cushion 78 deploys downwardly and rearwardly of the body and the cables 82 move as previously described, the net 50 on each side of the body is simultaneously deployed from its stored position shown in FIGS. 1, 2 and 3 to its position shown in FIG. 4 over a respective front door window and a portion of a respective rear door window 20. The nets effectively cover the front portions of each body side window opening 22 forwardly of the side edges of the cushion 78. The nets are deployed by the cables 92 breaking through the headlining and the trim material 70 as the anchor points 84 move downwardly and rearwardly of the body with the cables 82 as cushion 78 is deployed.

Preferably the nets 50 are made of any flexible material which is sufficiently strong so as to be engaged by a front seat occupant without tearing during such engagement. Woven nylon or an open mesh nylon net material would work well as material for the nets.

Although the nets 50 are shown in FIGS. 2 and 3 in a generally pleated condition when stored or undeployed, it will be understood, of course, that the nets may be likewise stored in other types of folded conditions, such as being rolled upon themselves.

While the rear portions of window openings 22 are not shown as being provided with nets, such nets could be provided and could be secured to the roof rail 26 rearwardly of the nets 50 and likewise to the rear pillars 28. Such nets could be operatively connected to the cables 82 so as to be deployed when the nets 50 are deployed.

Thus, this invention provides an improved occupant restraint system.

I claim:

1. In combination with a vehicle body including a side rail structure and a pillar structure respectively defining the upper and side edges of a body side window opening, an occupant restraint comprising, a net of flexible material, means securing the upper edge portion of the net to the body side rail and pillar structures, the net being normally stored in a folded condition adjacent the body side rail and pillar structures and upwardly of the window opening, means for sensing an impact condition of the body, endless cable means fixedly secured at one point to the lower edge portion of the net, means movably securing the cable means at a plurality of other points to the body for movement in one direction relative thereto, and means controlled by the sensing means for moving the cable means in the one direction relative to the movable securing means to locate the one point in a predetermined location and thereby deploy the net over the window opening.

2. In combination with a vehicle body including a side rail structure and a pillar structure respectively defining the upper and side edges of a body side window opening and rupturable means covering the side rail and pillar structures, an occupant restraint comprising, a net of flexible material, means securing the upper edge portion of the net to the body side rail and pillar structures, the net being normally stored in a folded condition adjacent the body side rail and pillar structures and upwardly of the window opening and of the rupturable means, means for sensing an impact condition of the body, endless cable means fixedly secured at one point to the lower edge portion of the net, means movably securing the cable means at a plurality of other points to the body for movement in one direction relative thereto, and means controlled by the sensing means for moving the cable means relative to the movable securing means to locate the one point in a predetermined location and thereby move the net through the rupturable means and deploy the net over the window opening.

3. In a vehicle body including side rail and pillar structures defining a body side window opening, a roof structure, a source of pressure fluid, an elongated inflatable member extending transversely of the body and secured to the roof structure for projection therefrom transversely of the window opening upon inflation by the pressure fluid source, and means interconnecting the member and the body to locate the inflated member in a predetermined position, the combination comprising, a net of flexible material and of a size sufficient to cover the portion of the window opening bounded by the side rail and pillar structures and the inflated member, means securing an upper edge portion of the net to the side rail and pillar structures, the net being normally stored in a folded condition adjacent the portion of the window opening and being deployable over the window opening from its secured upper edge portion, and means securing a lower edge portion of the net to the inflatable member for deployment of the net across the portion of the window opening upon inflation of the member.

4. In a vehicle body including side rail and pillar structures defining a body side window opening, a roof structure, rupturable means covering the side rail, pillar, and roof structures, a source of pressure fluid, an elongated inflatable member extending transversely of the body and secured to the roof structure for projection therefrom transversely of the window opening upon inflation by the pressure fluid source, and means interconnecting the member and the body to locate the inflated member in a predetermined position, the combination comprising, a net of flexible material and of a size sufficient to cover the portion of the window opening bounded by the side rail and pillar structures and the inflated member, means securing an upper edge portion of the net to the side rail and pillar structures, the net being normally stored in a folded condition above the rupturable means adjacent the portion of the window opening and being deployable over the window opening from its secured upper edge portion, and means securing a lower edge portion of the net to the inflatable member for deployment of the net through the rupturable means upon inflation of the member.

* * * * *